(12) United States Patent
Kumar et al.

(10) Patent No.: US 8,972,648 B2
(45) Date of Patent: *Mar. 3, 2015

(54) KERNAL MEMORY LOCKING FOR SYSTEMS THAT ALLOW OVER-COMMITMENT MEMORY

(71) Applicant: International Business Machines Corporation, Armonk, NY (US)

(72) Inventors: Keerthi Kumar, Bangalore (IN); Shailaja Mallya, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/105,297

(22) Filed: Dec. 13, 2013

(65) Prior Publication Data

US 2014/0122772 A1    May 1, 2014

Related U.S. Application Data

(63) Continuation of application No. 13/299,463, filed on Nov. 18, 2011.

(51) Int. Cl.
*G06F 12/00* (2006.01)
*G06F 12/02* (2006.01)
*G06F 9/50* (2006.01)

(52) U.S. Cl.
CPC .......... *G06F 12/0292* (2013.01); *G06F 9/5016* (2013.01); *G06F 9/5077* (2013.01)
USPC ................... 711/6; 711/1; 711/100; 711/147; 711/154; 711/162; 711/170; 711/200; 711/203; 711/208; 711/209; 711/216

(58) Field of Classification Search
CPC ..... G06F 12/126; G06F 12/109; G06F 12/10; G06F 12/023; G06F 12/08; G06F 12/1027; G06F 13/30; G06F 2212/6042; G06F 2212/222; G06F 3/0656; G06F 9/3867; G06F 9/3885

USPC ......... 711/1, 6, 100, 147, 154, 162, 170, 203, 711/216, E12.006, E12.058, E12.061, 711/E12.068, 200, 202, 208–209

See application file for complete search history.

(56) References Cited

U.S. PATENT DOCUMENTS 6,209,065 B1   3/2001  Van Doren et al.
6,865,688 B2   3/2005  Dawkins et al.

(Continued)

OTHER PUBLICATIONS

Chapin; "Hive: Operating System Fault Containment for Shared-Memory Multiprocessors"; Technical Report No. CSL-TR-97-712; Jul. 1997; pp. 1-156; Computer Systems Laboratory, Departments of Electrical Engineering and Computer Science, Stanford University; Stanford, CA, United States.

Govil et al.; "Cellular Disco: Resource Management Using Virtual Clusters on Shared-Memory Multiprocessors"; ACM Transactions on Computer Systems; Aug. 2000; pp. 229-262; vol. 18, No. 3; Stanford University; Stanford, CA, United States.

(Continued)

*Primary Examiner* — Jared Rutz
*Assistant Examiner* — Zhuo H Li
(74) *Attorney, Agent, or Firm* — Thomas E. Tyson; Gregory K. Goshorn; Greg Goshorn, P.C.

(57) ABSTRACT

Provided are techniques for allocating logical memory corresponding to a logical partition in a computing system; generating, a S/W PFT data structure corresponding to a first page of the logical memory, wherein the S/W PFT data structure comprises a field indicating that the corresponding first page of logical memory is a klock page; transmitting a request for a page of physical memory and the corresponding S/W PFT data structure to hypervisor, allocating physical memory corresponding to the request; and, in response to a pageout request, paging out available logical memory corresponding to the logical partition that does not indicate that the corresponding page is a klock page prior to paging out the first page.

6 Claims, 7 Drawing Sheets

(56) References Cited

U.S. PATENT DOCUMENTS

| | | | |
|---|---|---|---|
| 7,478,204 | B2 | 1/2009 | McKenney et al. |
| 2002/0010844 | A1 | 1/2002 | Noel et al. |
| 2009/0307435 | A1 | 12/2009 | Nevarez et al. |
| 2013/0132637 | A1 | 5/2013 | Kumar et al. |
| 2014/0143507 | A1* | 5/2014 | Maria Joseph et al. ....... 711/147 |
| 2014/0173227 | A1* | 6/2014 | Min et al. ..................... 711/159 |

OTHER PUBLICATIONS

Uhlig; "The Mechanics of In-Kernel Synchronization for a Scalable Microkernel"; IBM T.J Watson Research; Yorktown Heights, NY, United States.

Young et al.; "MGS: A Multigrain Shared Memory System"; May 1996; 23rd Annual International Symposium on Computer Architecture; Laboratory for Computer Science, Massachusetts Institute of Technology; Cambridge, MA, United States.

* cited by examiner

Figure 3

```
                    S/WPFT
                 DATA STRUCTURE
                    ↙ 200 struct_pft_swbits ⟍
    {                   202
        /* first 4 bits are major frame states */ ⟍
        unsigned_inuse    : 1; ⟍                   204
                                205
        unsigned_pageout  : 1; ⟍
                                206
        unsigned_pagein   : 1;
                              ⟍
                               207
        unsigned_free     : 1; ⟍
                                208
        unsigned_slist    : 1; ⟍
                                209
        unsigned_klock    : 1; ⟍
    }                            210
```

KERNAL MEMORY LOCKING FOR SYSTEMS THAT ALLOW OVER-COMMITMENT MEMORY

CROSS-REFERENCES TO RELATED APPLICATIONS

The present application is a continuation and claims the benefit of the filing date of an application entitled, "Kernel Memory Locking for Systems that Allow Over-Commitment Memory" Ser. No. 13/299,463, filed Nov. 18, 2011, assigned to the assignee of the present application, and herein incorporated by reference.

FIELD OF DISCLOSURE

The claimed subject matter relates generally to computing systems and, more specifically, to techniques for the allocation of real memory in conjunction with memory paging.

SUMMARY

Provided are techniques for the controlling of memory paging, in systems that allow over-commitment of real-memory. Over two decades ago, kernel memory has been configured as pageable so that particular operating systems (OSs), such the AIX OS published by the IBM Corporation of Armonk, N.Y., could work in small memory systems. In such systems, kernel data structures may be paged out to a paging space on a secondary computer-readable storage medium (CRSM) in a manner similar to the paging of user-space data.

In a system in which there is a single logical partition (LPAR) some kernel data structures may be pinned, or locked, in memory. In a simple kernel locking system, a least recently used (LRU) deamon cannot page out selected, or "pinned," kernel memory. Some kernel locking, systems employ "klock" pages, or kernel locked pages, which may include pages of some kernel extensions or kernel pages/kernel data/kernel stack pages. In klock page systems, user memory is paged out first and kernel memory is only paged out in the event there is no available user memory. One advantage of klock paging systems is that the chance of a server crash due to a memory fault is reduced.

In systems that permit multiple LPARs, Active Memory Sharing (AMS) relay be implemented. To handle a potential over commitment of memory, a hypervisor creates logical memory for each LPAR. When using logical memory, a system's real memory may become over committed. For example, in a system with twenty Gigabytes (20 GB) of memory, that may be three (3) LPARs, each with an allocation of eight (8) GB for a total of twenty-four (24) GB. In the event a hypervisor detects a need for memory, the hypervisor may page a particular LPAR's logical memory to a CRSM designated for the particular LPAR. In such a scenario, kernel locking may not be effective.

Provided are techniques for allocating logical memory corresponding to a logical partition in a computing system; generating a first data structure associated with to first page of the logical memory, wherein the first data structure comprises a first field indicating that the corresponding first page is a klock page; generating a second data structure corresponding to the first data structure and associated with a second page of the logical memory, wherein the second data structure comprises a field corresponding to the first field indicating that the second page is a non-klock page; allocating, by a hypervisor, physical memory corresponding to the first page and the second page; and prioritizing, by the hypervisor, the physical memory corresponding to the first page and the second page with respect to the klock/non-klock fields in the first and second data structures.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following, detailed description of the disclosed embodiments is considered in conjunction with the following figures, in which:

FIG. 3 is one example of a software page frame table (S/W PFT) data structure that may be used in one embodiment of the claimed subject matter.

DETAILED DESCRIPTION

Figure 1:
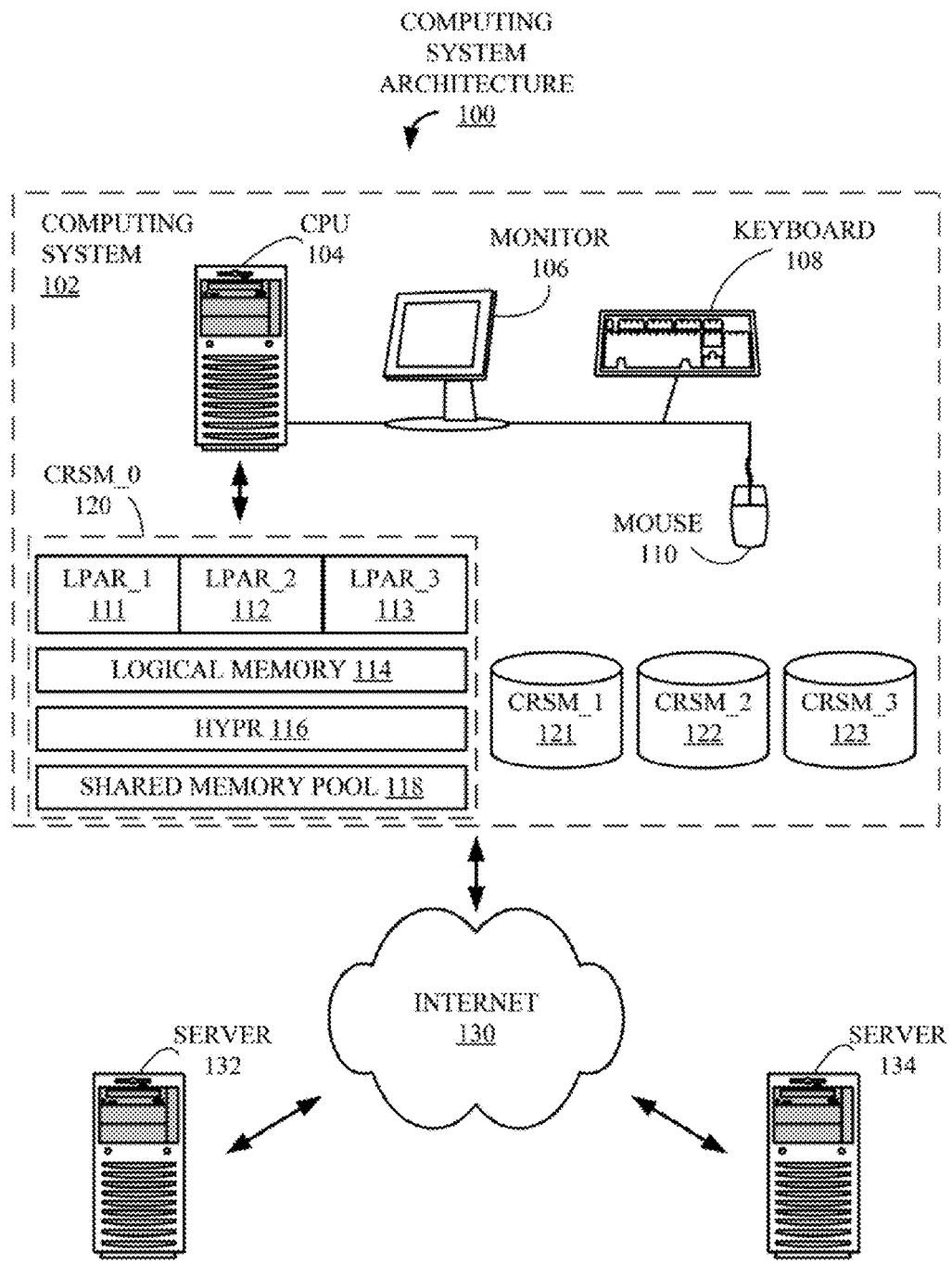
FIG. 1 is a block diagram of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, one disadvantage of pageable kernel memory is that performance may be inhibited in systems that enough memory to prevent memory paging. Another disadvantage of kernel paging is an inflated need for paging space because paging space used for kernel paging is typically not freed up for other uses. Another disadvantage is an inherent time latency required to resolve kernel page faults. Time latency may be a problem for some real-time processes such as a heart heat daemon.

Turning now in the figures, FIG. 1 is a block diagram of one example of a computing system architecture 100 that may incorporate the claimed subject matter. A computing system 102 includes a central processing unit (CPU) 104, coupled to a monitor 106, a keyboard 108 and a pointing device, or "mouse," 110, which together facilitate human interaction with computing system 100 and client system 102. Also included in client system 102 and attached to CPU 104 are computer-readable storage mediums (CRSMs), specifically a CRSM_0 120, a CRSM_1 121, CRSM_2 122 and a CRSM_3 123. Each of CRSMs 120-123 may either be incorporated into client system 102 i.e. an internal device, or attached externally to CPU 104 by means of various, commonly available connection devices such as but not limited to, a universal serial bus (USB) port (not shown).

CRSM_0 120 is illustrated storing as number of logical partitions, or LPARs, i.e. a LPAR_1 111, a LPAR_2 112 and a LPAR_3 113, a logical memory 114, a hypervisor (HYPR) 116 and a shared memory pool (SMP), or real memory, 118. As should be familiar to one with skill in the relevant arts, each of LPAR 111-113 may implement a different operating system (OS) such that multiple OSs (not shown) are able to run concurrently on computing system 102. The implementation and coordination of LPARs 111-113, logical memory 114. HYPR 116 and SMP 118 are explained in more detail below in conjunction with FIGS. 2-7.

Computing system 102 is also coupled to the Internet 130, which is in turn coupled to two (2) servers, i.e. a server 132 and a server 134. Although in this example, computing system 102 and servers 132 and 134 are communicatively coupled via the Internet 130, they could also be coupled through any number of communication mediums such as, but not limited to, a local area network (LAN) (not shown). Servers 132 and 134 are used as examples of resources that mat be available to computing system 102 and may include, but are not limited to, email servers and storage servers. It should be noted that a typical computing system would typically include many addition elements, but for the sake of simplicity only a few are shown.

Figure 2:
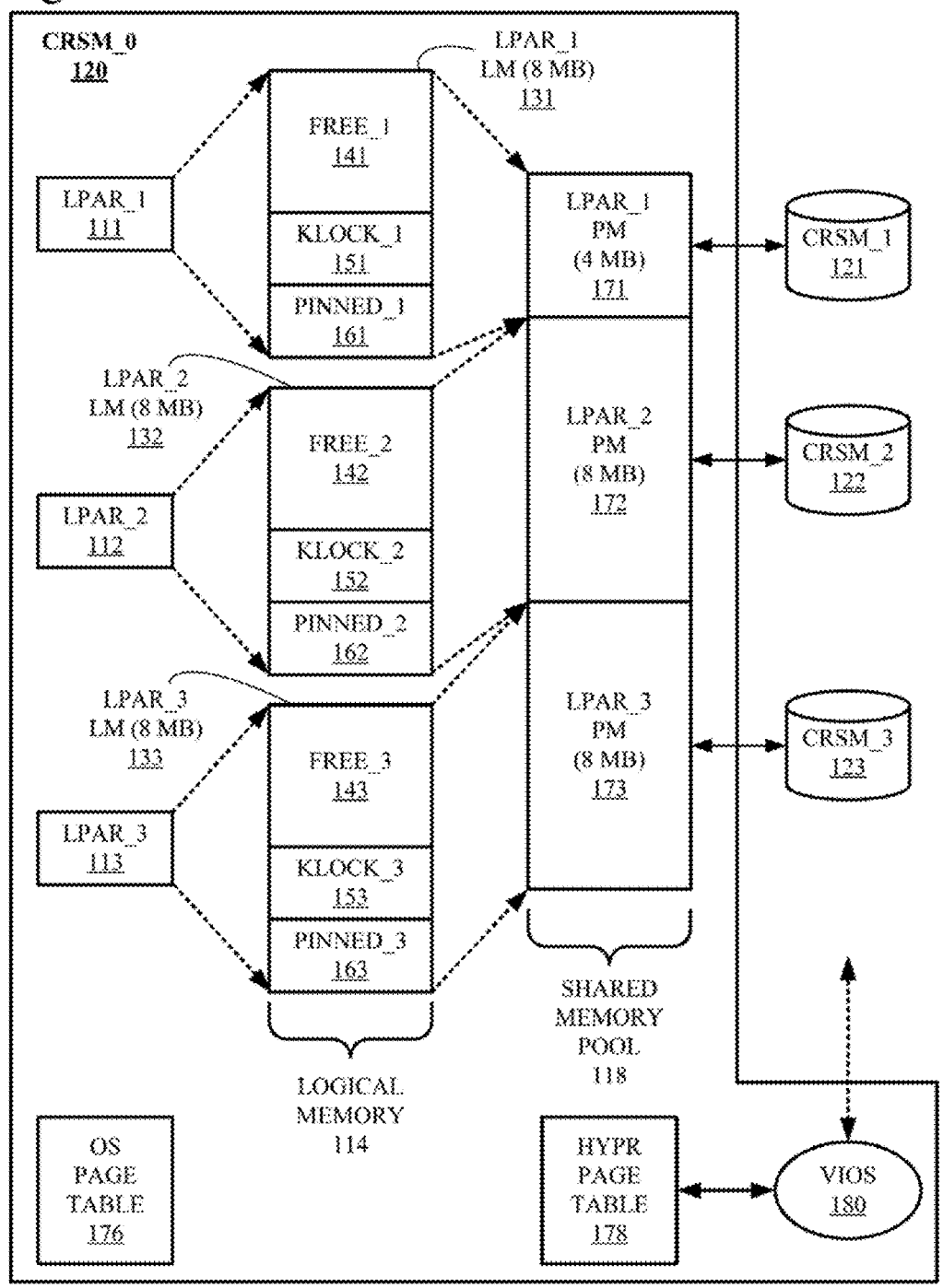
FIG. 2 is a block diagram of memory elements, first introduced in FIG. 1, in more detail.

FIG. 2 is a block diagram of memory elements, first introduced in FIG. 1, in more detail. Like FIG. 1, included in FIG. 2 are LPARs 111-113, logical memory 114, shared memory pool 118 and CRSMs 120-123. in this example, LPAR_1 121 is mapped to a section, i.e. LPAR_1 logical memory (LM) 131, of logical memory 114 that includes a block of free system memory, i.e. Free_1 141, an area of kernel data, i.e. klock_1 151, and an area of locked data, i.e. a pinned_1 161. Memory such as free_ 1 141 is able to be employed by LPAR_1 111 for data that may be freely paged in and out of, in this example. CRSM_1 121. Klock_1 151 is data that LPAR$_1$—111 has indicated should preferably not be paged in and out of memory such as CRSM 121. Pinned_1 151 is typically stored kernel memory that may not be paged in and out of memory such as CRSM 121 because of adverse impacts upon some processes such as, but not limited to, heartbeat and other real time processes.

Like LAPR 111, LPAR_2 112 is mapped to a section, i.e. LPAR_2 LM 132 of logical memory 114, i.e. a free_2 142, a klock_2 152 and as pinned_2 162, which serve the same functions for LPAR1 112 as free_1 141, klock_1 151 and pinned_1 161 server for LAPR_1 111. in a similar fashion, LPAR_3 113 is mapped to a section, i.e. LPAR_3 LM 133, of logical memory 114, i.e. a free_3 143, a klock_3 153 and a pinned_3 163. In this example, each of LPAR_1 LM 131, LAPR_2 LM 132 and LPAR_3 LM 133 are eight megabytes (8 MB) in size for a total of twenty-four megabytes (24 MB) of memory for logical memory 114.

In this example, LPAR LMs 131-133 are mapped to physical memory, or shared memory pool 118. LPAR_1 131 is mapped to LPAR_1 PM 171, LPAR_2 LM 132 is mapped to LPAR_2 PM 172 and LPAR_2 LM 133 is mapped to LPAR_3 PM 173. LPAR_1 PM 171 is four megabytes (4 MB) in size, LPAR_2 PM 172 is eight megabytes 8 MB) in size and LPAR_3 PM 173 is eight megabytes (1 MB) in size for a total of twenty megabytes (20 MB) of memory for shared memory pool 118. Since LPAR_2 112 and LPAR_3 113, each with 8 MB of logical memory 114, are mapped to a total of 16 MB of physical memory 118, there is no need to page memory into either CRSM_2 122 or CRSM_3 123, respectively. However, since LPAR_1 111, with 8 MB of logical memory, is mapped to only 4 MB of physical memory 118, i.e. LPAR_1 PM 171, there is a likelihood that memory may need to be paged in and out of CRSM_1 121.

Also illustrated in FIG. 2 are an operating system (OS) page table 176 and a hypervisor (HYPR) page table 178. OS page table 176 stores information for controlling the mapping of LPAR_1 111, LPAR_2 112 and LPAR_2 113 to LPAR_1 LM 131, LPAR_2 LM 132 and LPAR_3 LM 133, respectively. HYPR page table 178 stored information for controlling the mapping of LPAR_1 LM 131, LPAR_2 LM 132 and LPAR_2 LM 133 to LPAR_1 PM 171, LPAR_2 PM 172 and LPAR_3 PM 173, respectively.

A virtual input/output server (MS) 180 controls memory tasks for hypervisor 114 (FIG. 1). A dotted line to and from VIOS 180 indicated that VIOS 180 may use virtual memory devices that are implemented as physical devices such as CRSMs 121-123. it should be understood that the memory mappings shown in FIG. 2 are for illustrative purposes only and that one with skill in the relevant arts will appreciate that many different mappings are possible.

FIG. 3 is one example of a software page frame table data structure (S/W PFT) 200 that may be used in one embodiment of the claimed subject matter. S/W PFT 200 is named "struct_pft_swbits" 202. S/W PFT 200 includes six (6) one bit elements, specifically an unsigned bit 205, entitled "unsigned_inuse," an unsigned bit 206, entitled "unsigned_pageout," an unsigned bit 207, entitled "unsigned_pagein," an unsigned bit 208, entitled "unsigned_free," an unsigned bit 209, entitled "unsigned_slist" and an unsigned bit 210, entitled "unsigned_klock." Each of data elements 205-210 are defined as initialized to a value of '1'. A comment 204 indicates that a first four bits 205-208 of S/W PFT 200 store information related the states of a data frame to which data S/W PFT 200 is associated. The use of data elements 205-209 should be familiar to those with skill in the relevant arts. The use of unsigned_klock 210 is explained in more detail below in conjunction with FIGS. 4-7.

Figure 4:
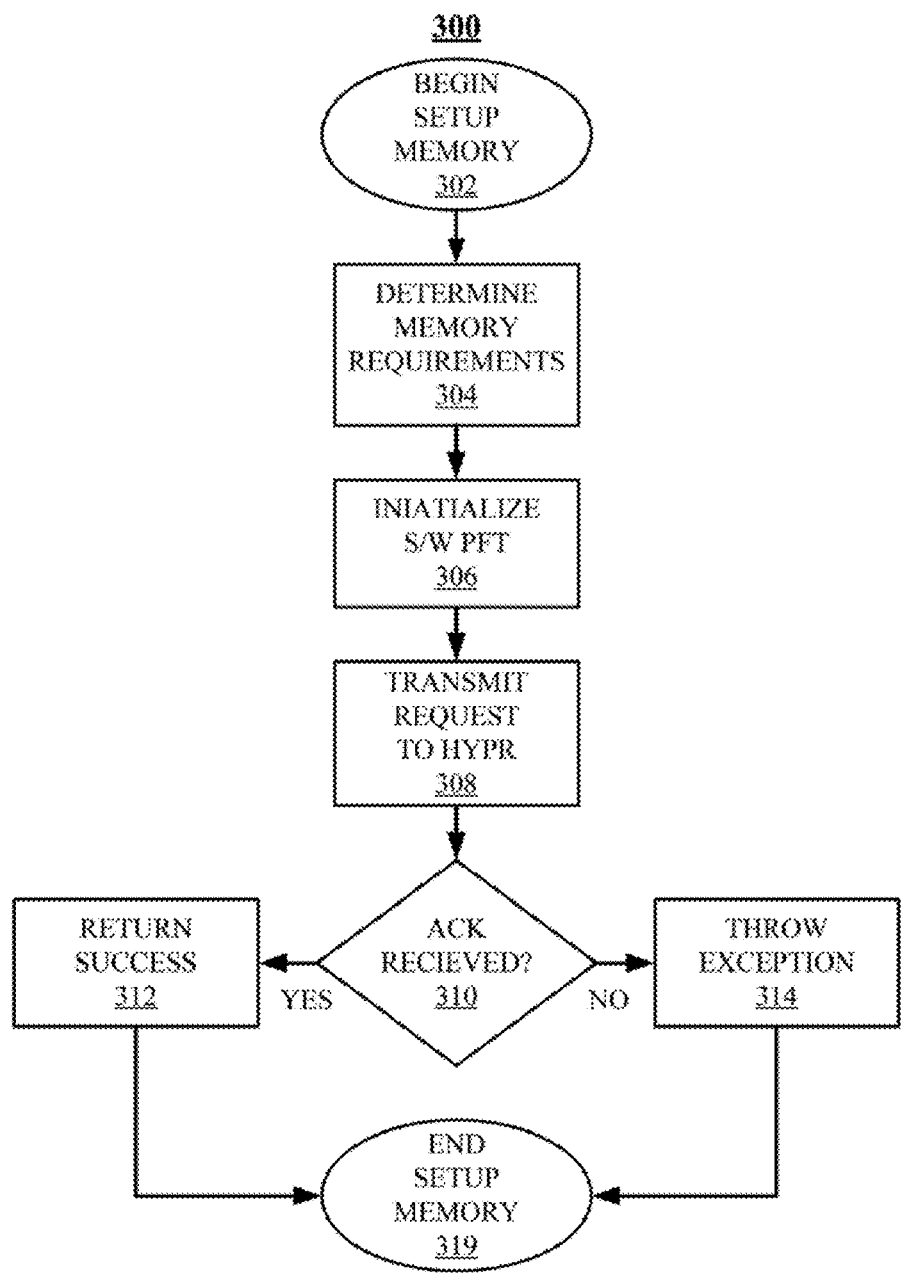
FIG. 4 is a flowchart showing one example of a Setup Memory process in accordance with the claimed subject matter.

FIG. 4 is a flowchart showing one example of a Setup Memory process 300 in accordance with the claimed subject matter. In this example, logic associated with process 300 is stored in CRSM_0 120 (FIG. 1) and executed on one or more processors (not shown) of computing system 102 (FIG. 1) in conjunction with a logical partition such as LPARs 111-113 (FIGS. 1 and 2). In his description, LPAR__1 111 is used as an example.

Process 300 starts in a "Begin Setup Memory" block 302 and proceeds immediately to an "Determine Memory Requirements" block 304. During processing associated with block 304, LPAR_1 111 determines the amount of memory required, which in this example is represented by LPAR_1 LM 131 and is 8 GB. As should be understood by one with skill in the relevant arts, the memory determined to be required during processing associated with block 304 is made up of a number of frames, or pages, with the specific number dependent upon the size of the needed memory. During processing associated with an "Initialize S/W PFT" block 306, a S/W PWT (see 200, FIG. 3) is initialized for each frame of memory determined to be needed. Although most fields in each S/W PWT should be familiar to one with skill in the relevant arts, unsigned klock 210 (FIG. 3) is novel and is set according to the locking status of the corresponding frame requested. For example, if the requested frame is intended to be a kernel page unsigned_klock is set to a value of 1 and, otherwise set to a value of '0'. In this example, all kernel pages are implicitly klock pages.

During processing associated with a "Transmit Request to Hypervisor (HYPR)" block 308, a memory request, with the corresponding S/W PFT structures are transmitted to HYPR 116. LPAR_1 111 then waits for an acknowledgment from HYPR 116 during processing associated with a "Ack Received?" block 310. If during processing associated with block 310, an acknowledgment is received from HYPR 116, control proceeds to a "Return Success" block 312 in which LPAR_1111 is notified of a successful allocation of memory, which in this example would be LPAR_1 131 (FIG. 2), mapped to LPAR_1 PM 171 (FIG. 2). It should be noted that each frame of LPAR_1 131 is associated with a S/W PFT with the field unsigned block 210 set to a value of 1 if the frame is one in Klock_151 (FIG. 2).

If during processing associated with block 310, a determination is made that an acknowledgement from HYPR 116 has not been received, either because of an explicit failure message from HYPR 116 or because of a timeout, control proceeds to a "Throw Exception" block 314. During processing associated with block 314, appropriate measures are taken to deal with a memory allocation issue, including notifying LPAR_111 of the failure. Finally, control proceeds to an "End Setup Memory" block 319 during which process 300 is complete.

Figure 5:
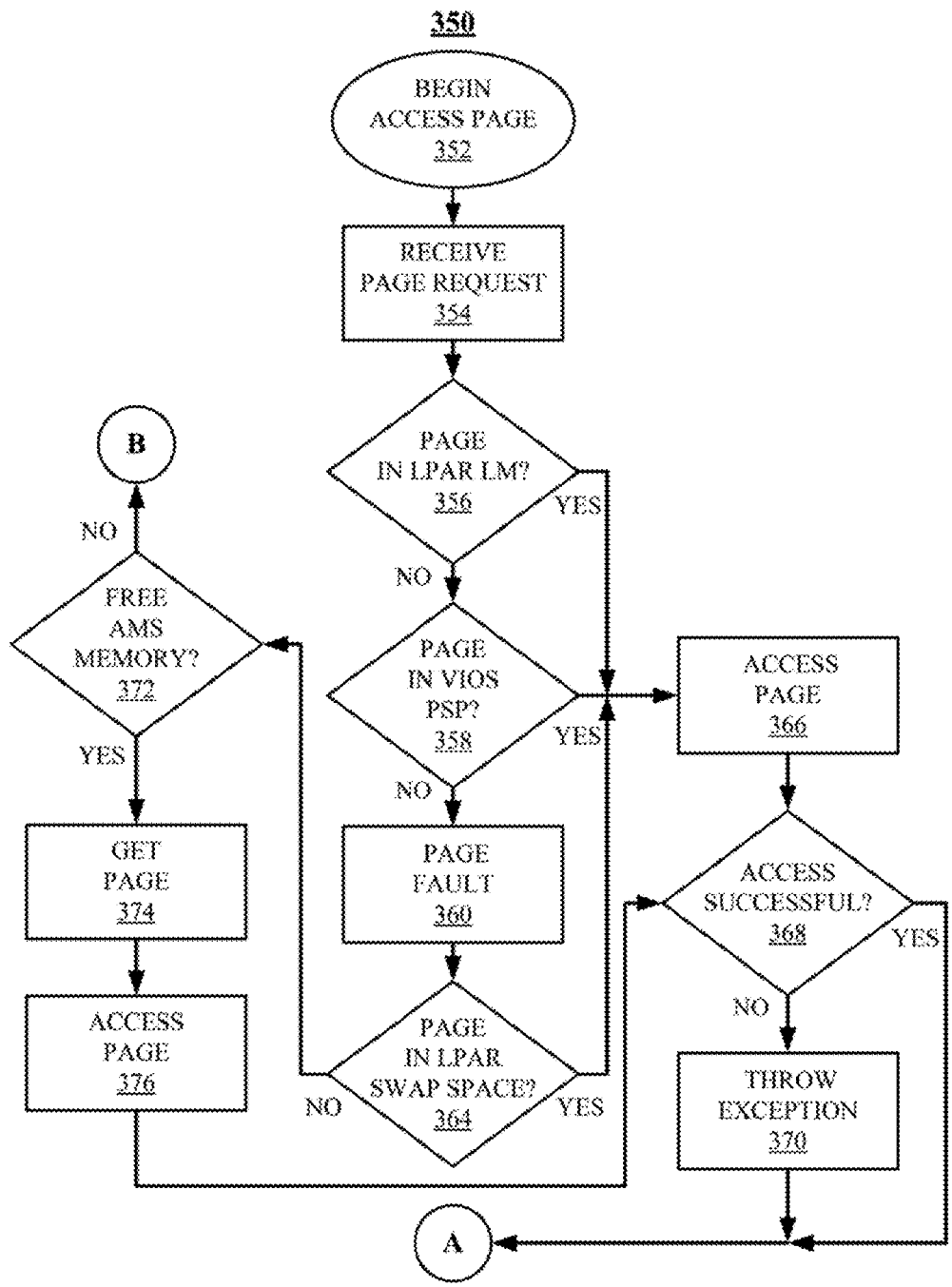
FIG. 5 is a flowchart showing an example of an Access Page process in accordance with the claimed subject matter.

FIG. 5 is a flowchart showing an example of an Access Page process 350 in accordance with the claimed subject matter. Like process 300, in this example, logic associated with process 350 is stored. in CRSM_0 120 (FIG. 1) and executed on one or more processors (not shown) of computing system 102 (FIG. 1).

Process 350 starts in a "Begin Access Page" block 352 and proceeds immediately to a "Receive Page Request" block 354. In this example, during processing associated with block 354. LPAR _1 111 (FIGS. 1 and 2) receives a request for a particular page in memory. During processing associated with a "Page in LPAR logical memory (LM)?" block 356, a determination is made as to whether or not the page requested During processing associated with block 354 is located in LPAR_1 LM 131. If not, during processing associated with a "Page in VIOS Paging Space for Partition (PSP)?" block 358. a determination is made as to whether or not the requested page is located in a PSP controlled by VIOS 180 (FIG. 2), or in other words, in a CRSM corresponding to the LAPR, i.e. CRSM_1 121 (FIGS. 1 and 2) corresponding to LPAR_1 111, If a determination is made that the requested page is not in PSP controlled by VIOS 180, a page fault is signaled during processing associated with a "Page Fault" block 360.

During processing associated with a "Page in LPAR Swap Space?" block 364, a determination is made as to whether or not the requested page is located in the swap space of LPAR_1 111, which in this example is CRSM_0 120. If the page requested during processing associated with block 354 is determined to be located in LPAR_1 LM 131 during processing associated with block 356, in PSP controlled by VIOS 180 during processing associated with block 358 or in LPAR swap space during processing associated with block 364, control proceeds to an "Access Page" block 366 during which the requested page is access, or retrieved from the corresponding memory. During processing associated with an "Access Successful?" block 368, a determination is made as to whether or not the access of the requested page during processing associated with block 366 was successful. 11 so, control proceeds to a transition point A (see FIG. 6). If not, control proceeds to a "Throw Exception" block 370 and then to transition point A. During processing associated with block 370, appropriate actions are taken to indicate to LPAR_1 111 that the page was not able to be accessed.

If the page is not located in LPAR swap space during processing associated with block 364, control proceeds to a "Free AMS Memory?" block 372. During processing associated with block 372, a determination is made as to whether or not there is memory available in shared memory pool 118 (FIG. 2). If not control proceeds to a Transition Point B (see FIG. 6). If so, control proceeds to a "Get Page" block 374. During processing associated with block 374, the page of memory requested during processing associated with block 354 is loaded into the available space in shared memory pool 118. During processing associated with an "Access Page" block 376 the page loaded during processing with block 374 is accessed. Control proceeds to Access Successful? block 368 and processing continues as describe above. Processing continues via either Transition Point A or B as described below in conjunction with FIG. 6.

Figure 6:
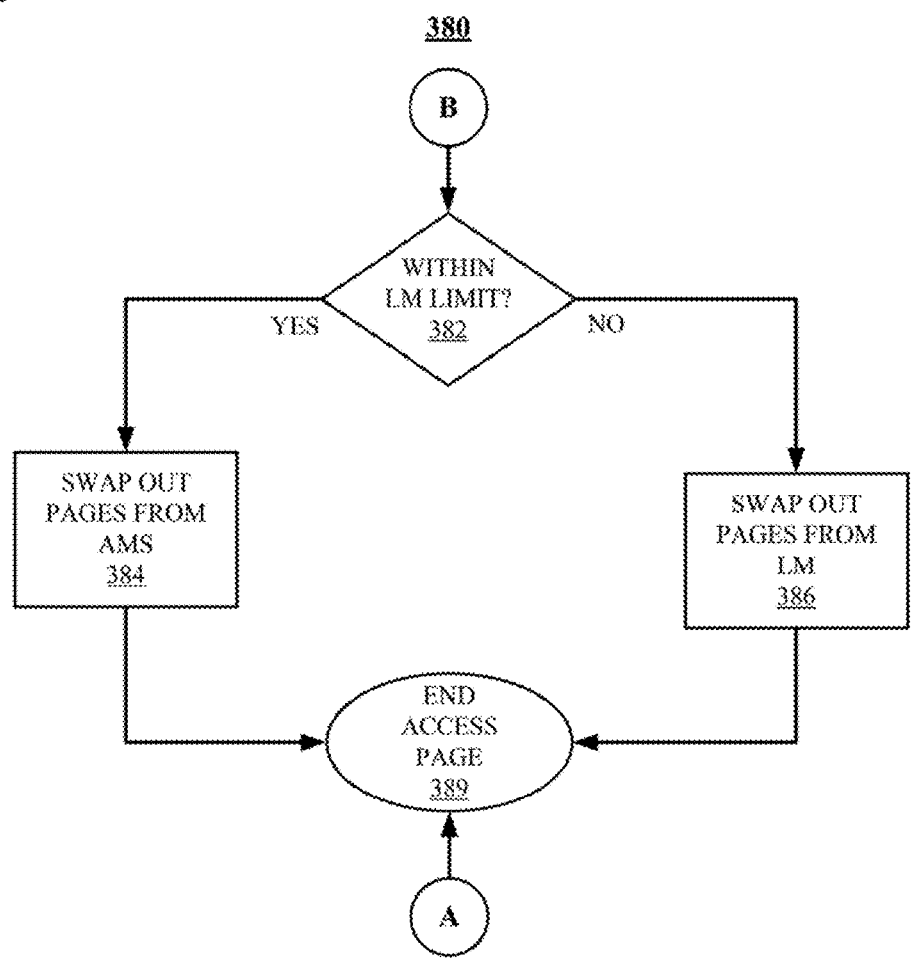
FIG. 6 is a flowchart showing additional aspects of Access Page process first introduced in FIG. 5.

FIG. 6 is a flowchart showing further processing 380 associated with Access Page process 350 (FIG. 5). Process 380 is entered via either Transition Point A or B (see FIG. 5). Via Transition point B, control proceeds to a "Within Logical Memory (EM) Limit?" block 382. During processing associated with block 382, it determination is made as to whether or not the memory requested during processing associated with block 354 (see FIG. 5) is within the limits of LPAR_LM 131 (FIG. 2) of LPAR_1 111 (FIGS. 1 and 2), which in this example is eight Gigabytes (8 GB). If so, control proceeds to a "Swap Out Pages From AMS" block 384. During processing associated with block 384, pages from LPAR_1 PM 171 (FIGS. 1 and 2) are swapped out to CRSM_1 121 (FIGS. 1 and 2). Pages are swapped out in accordance with the disclosed technology (see FIG. 7), i.e. non-klock pages are swapped before any klock pages. The claimed technology provides this feature with respect to HYPR 116 (FIG. 1), a feature that is not provided by the prior art.

If during processing associated with block 382, a determination is made that the memory requested is not within the limits of LPAR_1 LM 131, control proceeds to a "Swap Pages From LM) block 386. During processing associated with block 386, pages are swapped from LPAR_1 LM 131 to clear space for the pages requested during processing associated with block 354. Finally, control proceeds to an "End Access Page" block 389 during which process 380, and process 350, are complete.

Figure 7:
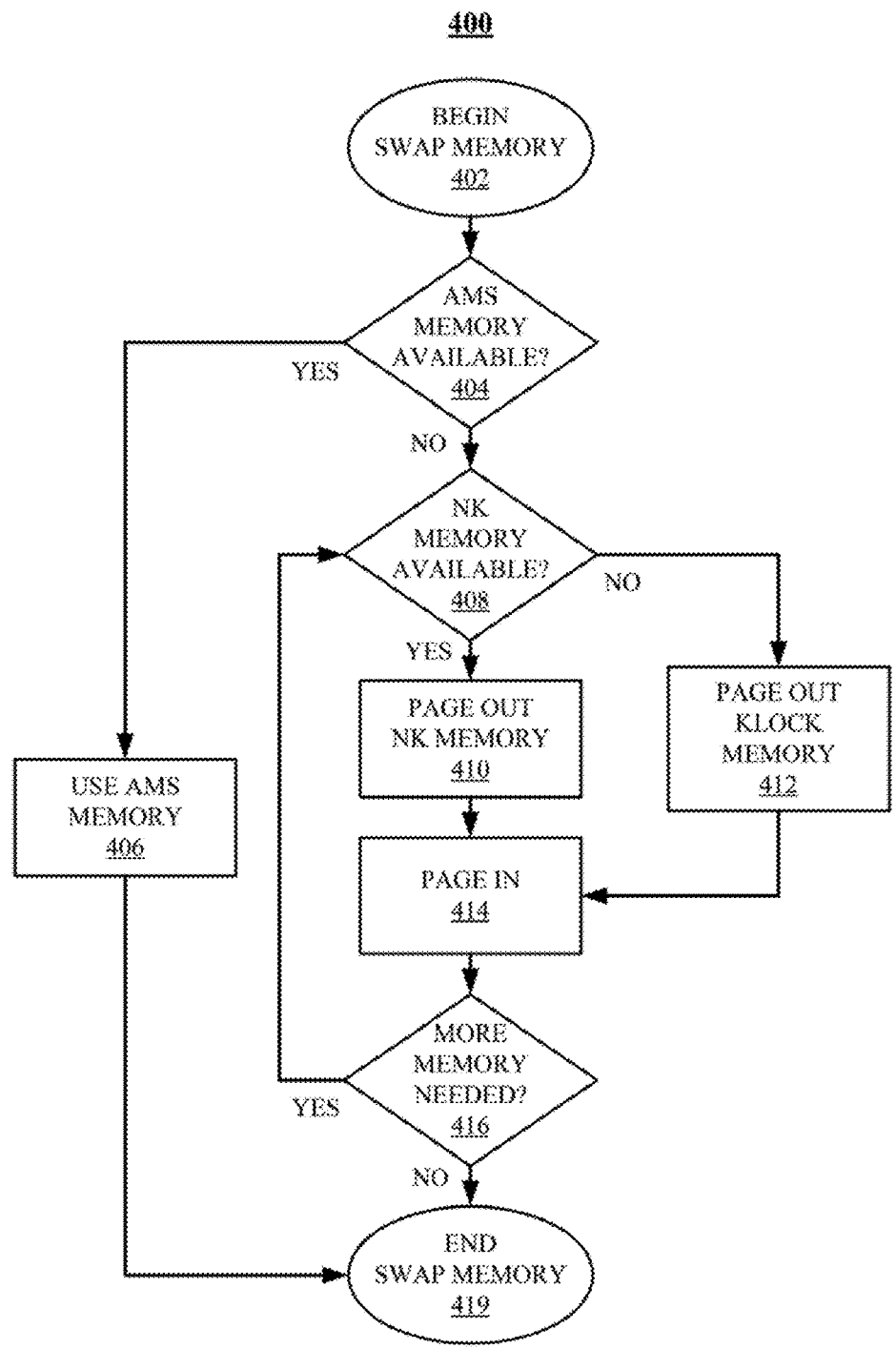
FIG. 7 is a flowchart of showing one example of a Swap Memory process in accordance with the claimed subject matter.

FIG. 7 is a flowchart of showing one example of a Swap Memory process 400 in accordance with the claimed subject matter. Like processes 300 and 350, in this example, logic associated with process 400 is stored in CRSM_0 120 (FIG. 1) and executed on one or more processors (not shown) of computing system 102 (FIG. 1). Unlike processes 300 and 350, which are executed in conjunction with LPAR 121-123, process 400 is executed in conjunction with HYPR 116 (FIGS. 1 and 2). In the example. LPAR_1 111 is requesting a particular page of memory from HYPR 116.

The following example may be best understood in light of the following scenario. Assume that LPAR_2 112 (FIGS. 1 and 2) and LPAR_3 113 start operating such that sixteen gigabytes (16 GB) of logical memory is mapped to 16 GB of real memory, i.e. LAPR_2 LM 132 (FIG. 2) is mapped to LPAR_2 PM 172 (FIG. 2) and LAPR_3 LM 133 (FIG. 2) is mapped to LPAR_3 PM 173. Since shared memory pool 118 contains twenty gigabytes (20 GB), there is plenty of memory to cater to the memory requirements of LPAR_2 112 and LPAR_3 113. Now assume that both LPAR_2 112 and LPAR_3 113 are under stress so that they are actually using all 16 GB.

If LPAR_1 111 is now activated with a requirement of 4 GB of memory, there is no issue because shared memory pool 118 has 4 GB of unallocated memory remaining. In other words, if LPAR_1 111 only needs 4 GB of memory, LPAR_1 111 may function without memory issues. However, if LPAR_1 111 is also put under stress such that 8 GB of memory is required, then 8 GB of logical memory 114 must be mapped to 4 GB of shared memory pool 118. If 1 GB of LPAR_1 LM 131 is pinned, i.e. Pinned_1 161 (FIG. 2), then 7 GB of logical memory 114 must be mapped to 3 GB of real memory 118.

Assuming that real memory 118 currently has eight hundred megabytes (800 MB) allocated for klock_1 151 and 2.2 GB allocated for free_1 141, the remaining 4 GB, or 200 MB of klock_1 151 and 3.2 GB of free_1 141 would reside in paging space of a page space partition on CRSM_1 121, controlled by HYPR page table 178 (FIG. 2). If 500 MB of user pages and 500 MB of kernel pages are referred to continuously, then HYPR 116 does page ins and page outs operations for the existing 800 MB kernel pages and the 2.2 GB of user pages to the page space partition on CRSM_1 121. In such a case kernel pages may be paged onto CRSM_1 121 with may result in a delay when the pages are accessed. Some applications such as real time processes and heartbeat daemons may crash as a result.

In contrast to current technology, when implemented in accordance with the disclosed technology, only the 2.2 GB of user pages are paged in and out and the 500 MB of kernel data is not paged out unless there are no user pages that may be paged. In this manner, application such as, but not limited to, real time processes and heartbeat daemons are able to execute more predictably and with fewer faults than the same processes may execute under current system.

Process 400 starts in a "Begin Swap Memory" block 402 and proceeds immediately to an "A MS Memory Available?" block 404. During processing associated with block 404, a determination is made as to whether or not AMS memory is available to load the page requested during processing associated with block 354 (FIG. 5). If so, control proceeds to a "Use AMS Memory" block 406, and the available AMS memory, which in this example would be Free_1 141 (FIG. 2) is utilized. If not, control proceeds to a Non-Klock (NK Memory Available?" block 408. During processing associated with block 408, a determination is made as to whether or not non-klock memory, which in the example is memory associated with LPAR_1 PM 141 but not associated with either klock_1 151 or pinned_161. If so, during processing associated with a "Page Out non-klock (NK) Memory" block 410 the memory not associated with either klock_1 151 or pinned$_1$ —1 161 is swapped to CRSM_1 121. If, during processing associated with block 408, a determination is made that NK memory is not available, control proceeds to a "Page Out Klock Memory" block 412. During processing associated with block 412, memory in LPAR_1 PM 141 associated with klock_1 151 is swapped to CRSM_1 121.

During processing associated with a "Page In" block 412, the page requested during processing associated with block 354 is copied into the space created during processing associated with block 410 or 412. During processing associated with a More Memory Needed?" block 416, a determination is made as to whether or not all the pages requested have been paged in. If not, control returns to NK Memory Available? block 404 and processing, continues as described above. In this manner, HYPR 116 is able to ensure that all non-klock memory is utilized before any klock memory is needed. Finally, control proceeds to an "End Swap Memory" block 419 during which process 400 is complete.

The terminology used herein is fur the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   allocating logical memory corresponding to a logical partition in a computing system;
   generating a first data structure associated with a first page of the logical memory, wherein the first data structure comprises a first field indicating that the corresponding first page is a klock page;
   generating a second data structure corresponding to the first data structure and associated with a second page of the logical memory, wherein the second data structure comprises a field corresponding to the first field indicating that the second page is a non-klock page;
   allocating, by a hypervisor, physical memory corresponding to the first page and the second page; and
   prioritizing, by the hypervisor the physical memory corresponding to the first page and the second page with respect to the klock/non-klock fields in the first and second data structures.

2. The method of claim 1, further comprising:
   transmitting a request for a third page of physical memory to the hypervisor; and
   in response to a page fault corresponding to the request for the third page, paging out available logical memory corresponding to either the first or the second page based upon the prioritizing.

3. The method of claim 1, wherein the first and second data structures are software page frame table (SW/PFT) structures augmented with as field to represent that is corresponding page is either a klock page or a non-klock page.

4. The method of claim 1, wherein the prioritizing ensures that non-klock pages are not paged out by the hypervisor prior to paging out an available klock page.

5. The method of claim 4, further comprising, in response to the page fault, paging out the first page prior to paging out an available pinned page.

6. The method of claim 1, wherein the paging is implemented by as virtual input/output server (VIOS).

* * * * *